(No Model.)
J. A. M. TYLER & J. S. THOMAS.
FOUR HORSE EQUALIZER.
No. 384,652. Patented June 19, 1888.
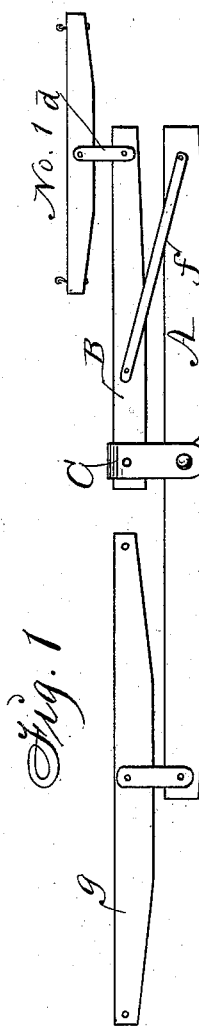
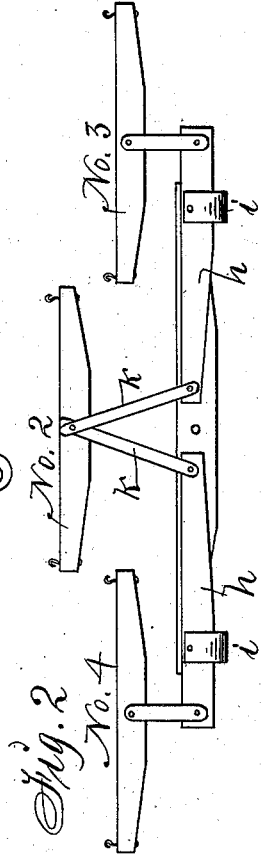
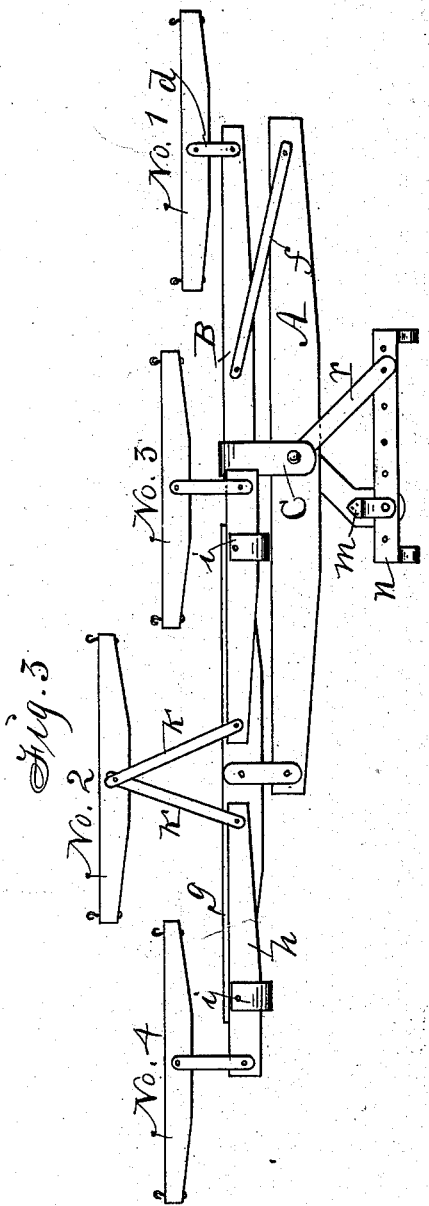
Witnesses:
R. H. Orwig.
M. P. Smith.
Inventors:
James S. Thomas,
James A. M. Tyler,
By Thomas G. Orwig, Att'y.

UNITED STATES PATENT OFFICE.

JAMES A. M. TYLER AND JAMES S. THOMAS, OF PLUM CREEK, NEBRASKA.

FOUR-HORSE EQUALIZER.

SPECIFICATION forming part of Letters Patent No. 384,652, dated June 19, 1888.

Application filed October 14, 1887. Serial No. 252,385. (No model.)

*To all whom it may concern:*

Be it known that we, JAMES A. M. TYLER and JAMES S. THOMAS, citizens of the United States of America, and residents of Plum Creek, Dawson county, in the State of Nebraska, have invented an Improved Four-Horse Equalizer, of which the following is a specification.

Our object is to provide a means for hitching four horses abreast to a harvester and binder, so that they can walk on the stubble while the machine cuts the grain at their side, and to a plow in such a manner that one horse can walk in the furrow and the other three on the land without causing any side draft.

Our invention consists in the construction and combination of a compound lever, a three-horse evener, and an adjustable coupling for connecting the complete device with a harvester or plow, as hereinafter fully set forth, pointed out in our claims, and illustrated in the accompanying drawings, in which—

Figure 1 is a top view of the compound lever; Fig. 2, of a three-horse evener; and Fig. 3 shows the complete equalizer ready to be applied.

A is a straight wooden bar designed to be pivoted at its center to a coupling device adapted to be attached to a harvester or plow.

B is a straight bar pivoted at its inner end to a yoke, C, that is pivoted at its rear end to the center of the bar.

No. 1 is a singletree flexibly connected with the outer end of the bar B by means of metal straps or links $d$, or in any suitable way that will allow the singletree to remain in parallel position with the bar A, while the bar B assumes an inclined position relative to said bar and singletree, as indicated by dotted lines in Fig. 1.

$f$ are straight metal bars pivoted to one end of the bar A and to the inner portion of the bar B in such a manner as to produce a compound lever that will maintain a balance between a single horse hitched to the outer end of the said bar B and three horses hitched to the opposite end of the bar A by means of a three-horse evener attached thereto, as shown in Fig. 3.

$g$ is a straight bar and the main piece of our three-horse evener. $h\ h$ are levers of the first order pivoted to the ends of the bar $g$ by means of clevises $i$.

No. 2 is a singletree flexibly connected with the inner ends and long arms of the levers $h$ by means of short metal bars $k$.

Nos. 3 and 4 are singletrees connected with the outer ends and short arms of the same levers $h$ in such a manner that the draft force applied to the singletree No. 2 by one horse will balance the force applied by the two horses hitched to the singletrees Nos. 3 and 4 on the opposite sides of the singletree No. 2.

$m$ is an elbow-shaped metal plate pivoted to the center of the bar A.

$n$ is a perforated hinge-iron adjustably connected with the free end of the plate $m$, and adapted to be hinged to the frame of a harvester or the beam of a plow.

$r$ is a metal stay-strap pivoted to the bar A and plate $m$ at one end, and adjustably connected with the perforated hinge-iron $n$ at its other end, as shown in Fig. 3, in such a manner that our complete device can be adjustably connected with the hinge-iron to shift the joint draft force of four horses laterally relative to the frame of a harvester or the beam of a plow, as required, to make the complete device effective in preventing side draft.

We are aware that a three-horse equalizer has been constructed like the one shown in our four-horse equalizer. We are also aware that three levers have been pivoted to a block fixed to a pole and connected by means of straps in such a manner as to produce a compound lever to which a single horse could be hitched to equalize the draft applied to the center lever that extended on the opposite side of the pole; but our manner of constructing a compound lever by means of a yoke and two parallel levers of unequal length, and combining a three-horse equalizer therewith to produce a four-horse equalizer, and our manner of constructing and combining an adjustable coupling therewith is novel and greatly advantageous.

We claim as our invention—

1. In a four-horse equalizer, the combination of the bars A and B, the yoke C, and metal straps $f$, substantially as shown and described, for the purposes stated.

2. The adjustable coupling device consisting of the plate $m$, hinge-iron $n$, and straps $r$, in combination with the bar A, substantially as and for the purposes stated.

3. In a four-horse equalizer, the combination of the bars A and B, the yoke C, and metal straps $f$, and a singletree, and a three-horse evener composed of a bar, $g$, two levers, $h$, two clevises, $i$, two bars, $k$, and three singletrees, arranged and combined to operate in the manner set forth, for the purposes stated.

JAMES A. M. TYLER.
JAMES S. THOMAS.

Witnesses:
JOSEPH ORMOND,
H. O. SMITH.